(No Model.)
I. H. SPELMAN.
SAW TOOTH GAGE.
No. 580,430. Patented Apr. 13, 1897.
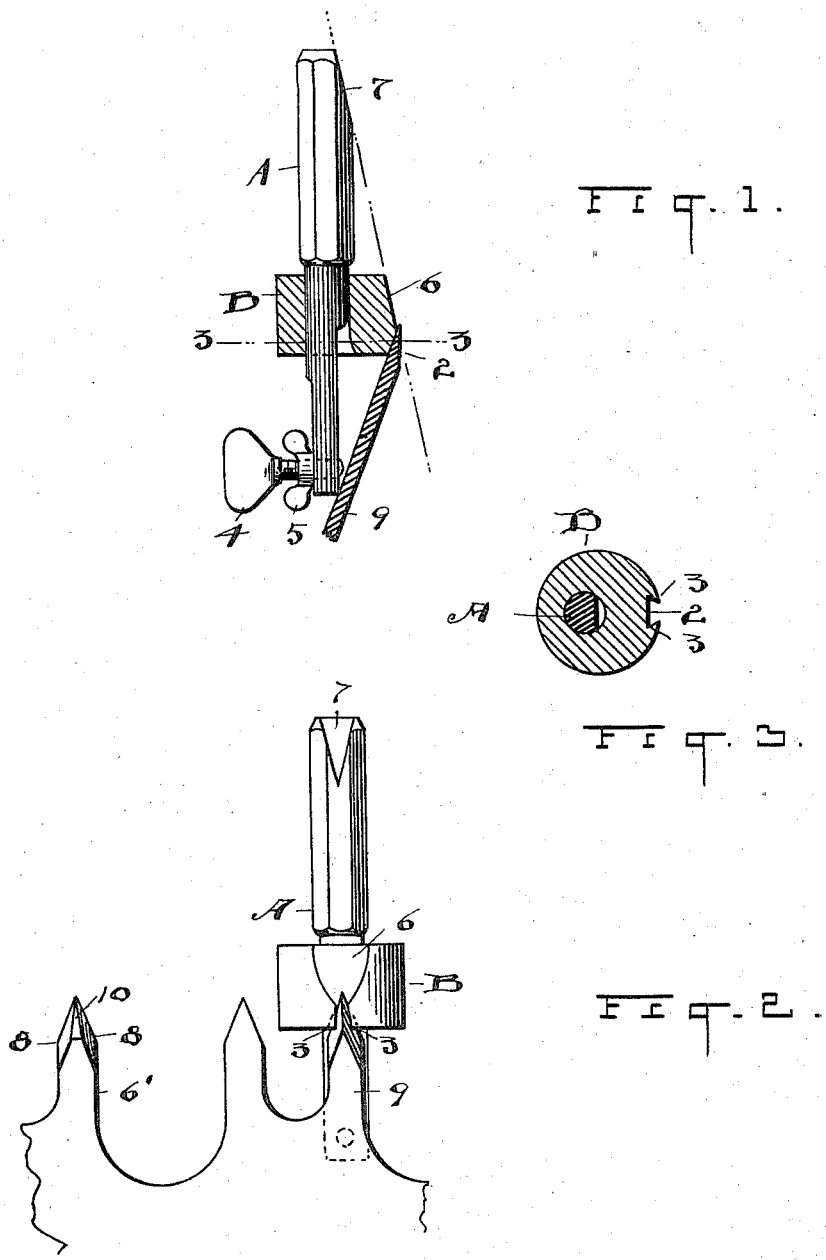
ATTEST
A. B. Moser
Nellie M. Thomas.
INVENTOR
Irwin H. Spelman
By H. S. Fisher
ATTORNEY

UNITED STATES PATENT OFFICE.

IRWIN H. SPELMAN, OF CLEVELAND, OHIO.

SAW-TOOTH GAGE.

SPECIFICATION forming part of Letters Patent No. 580,430, dated April 13, 1897.

Application filed January 7, 1895. Serial No. 534,129. (No model.)

*To all whom it may concern:*

Be it known that I, IRWIN H. SPELMAN, a citizen of the United States, residing at Cleveland, in the county of Cuyahoga and State of Ohio, have invented certain new and useful Improvements in Saw-Tooth Gages; and I do hereby declare that the following is a full, clear, and exact description of the invention, which will enable others skilled in the art to which it appertains to make and use the same.

My invention relates to saw-tooth gages; and the invention consists in the construction substantially as shown and described, and particularly pointed out in the claims.

In the accompanying drawings, Figure 1 is a vertical central sectional elevation of a combined saw-set and gage constructed according to my invention and showing a section of a crosscut-saw tooth in the gage, in a sleeve or head, as also seen in Fig. 2. Fig. 2 is a front elevation of my improved tool, showing one tooth of a section of a saw engaged in the gaging-notch in the collar or head of the tool. Fig. 3 is a cross-section of a collar and stem or handle on line 3 3, Fig. 1, showing a cross-section of the gage-notch and jaws.

It will be seen by the foregoing figures that the device is constructed to gage the pitch of the transverse bevel on the tooth-points, which comes between the edge bevels.

A represents the stem or handle of the tool, and B a collar or head thereon. This collar or head has at one side an undercut or under-beveled recess or notch 2 in its lower edge at an inclination to the axis of the handle with the lower portion of the notch inclined inward toward the handle and formed with holding-jaws 3, undercut as shown and described. The sleeve B occupies the handle toward the lower end thereof and is detachably supported on said handle. The inclined beveled face of the notch 2 is designed to be substantially in line with the lower extremity of the handle or stem A, and the said notch has only sufficient depth to accommodate the tooth at its base, about as shown in the drawings, and so as to expose the part to be cut away, and the said notch, furthermore, is so constructed as to permit the tooth to project not only therein, but out through the upper portion of the notch and expose the point of the tooth sufficiently to approach it with a file and cut the bevel thereon which the tooth requires. The middle line of the tooth runs back from the point beyond the sides of the notch sufficiently to allow the file to be placed thereon and cut it down the desired depth. Of course the sides or jaws 3 of the said notch are tempered hard, so as not to be affected by the file and to resist its action.

The lower extremity of the handle has the set-screw 4 projecting through it and adapted to engage against the inner side of the saw when the tooth is in the gage and said screw is in position to form a bearing for the saw at that side, whereby to throw the saw to different inclinations to the axis of the handle and hence in different positions in the notch 2, according as one angle or another of bevel on the tooth may be desired. The lock-nut 5 on the thumb-screw 4 serves to lock the said screw in any position of adjustment.

The collar B immediately above the notch 2 has an oppositely-inclined bevel 6, which is placed there to afford clearance for the file and to bring the tooth-point into prominence for beveling or sharpening, as herein provided for. The top of the handle A has a bevel portion 7 at the same inclination as the bevel 6 on the collar and tempered hard to serve as a file-rest.

The tool herein described is more especially adapted to crosscut-saws and for gaging the series of teeth toward the ends of the saw or between the ends of the middle clearance-teeth. These cutting-teeth are the ones which require gaging or beveling, as herein described. The drag-teeth at the middle are not beveled in any direction. However, this device may be used for gaging any kind of teeth which require it whether they be in a crosscut-saw or in any other kind, it being understood that different sizes of the notch 2 may be employed according to the size of the teeth to be treated. For this purpose interchangeable collars or heads may be used.

In Fig. 2 one tooth 6' is shown as having the bevel 10 produced by this construction and operation, while it also shows the side bevels 8 previously made. In the same figure the tooth 9 is in the gage to be treated.

In operation the bevel or face 7 becomes a rest for the file, and it is so hard that the file simply slides over it without taking hold. It therefore serves as a guide and support for the file as it is drawn back and forth in cutting the bevel 10 on the tooth. Of course the tool here shown is comparatively small and rests on the tooth of the saw while the operation of beveling or gaging takes place.

What I claim is—

1. The handle and a lateral projection thereon having a notch on its outside with undercut sides adapted to engage over the sides of a saw-tooth, and an adjusting-screw in the extremity of said handle below said projection, substantially as described.

2. The handle and the collar and the notch in the lower edge of the collar having undercut sides adapted to engage over the sides of the tooth, and an adjusting-screw in the extremity of said handle beneath said collar, substantially as set forth.

3. The handle and the collar thereon, said handle having a notch with undercut sides to engage the teeth and a beveled surface on the handle above the said notch, substantially as set forth.

4. The handle, having the bevel at its upper end, the collar on said handle provided with a bevel parallel to the bevel on the handle, a notch in the lower edge of said collar below the bevel therein having undercut sides to engage over the edges of the tooth, and the set or thumb screw in the lower portion of the handle to bear against the saw when it is being gaged, substantially as set forth.

5. The handle having a beveled hardened rest-surface at its top, in combination with the collar on the handle having a notch to engage a saw-tooth at a reverse inclination to said file-rest surface, substantially as set forth.

Witness my hand to the foregoing specification this 19th day of December, 1894.

IRWIN H. SPELMAN.

Witnesses:
H. T. FISHER,
FRANK A. GILBERT.